Patented Apr. 11, 1950

2,504,052

UNITED STATES PATENT OFFICE 2,504,052

ALLYLIC FUMARATE-ALLYLIC ALCOHOL INTERPOLYMERS

Robert H. Snyder, Newark, N. J., assignor to United States Rubber Company, New York, N. Y., a corporation of New Jersey No Drawing. Application June 16, 1945, Serial No. 599,969

6 Claims. (Cl. 260—78.5)

This invention relates to a new class of unsaturated polymeric materials of relatively low molecular weight which are soluble in a variety of organic solvents and which in the presence of heat and/or catalysts can be converted to insoluble, infusible products by further polymerization or by interpolymerization with other unsaturated organic materials capable of addition polymerization. The invention also includes the method of making the new products. My new unsaturated interpolymers are obtained by polymerizing a mixture of a monomeric allylic fumarate and a monomeric allylic alcohol.

It is known to polymerize allylic fumarates such as diallyl fumarate, dimethallyl fumarate, etc., and prior workers have been aware of the difficulty in controlling the polymerization of these allylic fumarates so as to obtain soluble, fusible polymers. Various devices for increasing the yield of soluble, fusible polymers have been suggested, such as carrying the polymerization out at elevated temperatures, preferably in the range of 180° C. or higher. However, since the rate of the polymerization is enormously accelerated at these temperatures, control of the reaction becomes difficult, particularly in a reaction vessel of industrial size, and premature insolubilization of the reaction mixture becomes increasingly difficult to avoid.

It is also known that higher yields of soluble, fusible products can be obtained by polymerization in a solvent, the concentration of monomeric allylic fumarate being kept below 40% by weight. However, the rate of polymerization tends to decrease in dilute solution, the conversion of monomer to polymer is still comparatively inefficient and the solvent increases the material cost, necessitates additional time and labor for its removal from the reaction product, and lowers the production capacity of the reaction vessel.

I have now found, unexpectedly, that polymerizing a monomeric allylic fumarate in the presence of a sufficient quantity of a monomeric allylic alcohol by heating the mixture, in the range from about 25° C. to about 120° C. (although higher temperatures may be employed if desired), and in the presence of conventional peroxidic catalysts, gives high yields of soluble, fusible products. Preferred temperatures are those below 120° C. Examples of suitable catalysts are acetyl peroxide, benzoyl peroxide, acetyl benzoyl peroxide, succinyl peroxide and tertiary-butyl hydrogen peroxide.

The course of the polymerization can be followed by observing the increase in the viscosity of the reaction mixture. When the copolymerization has proceeded to the desired extent the reaction is halted by cooling. The resulting interpolymer can be recovered from the reaction mixture by distilling out any unreacted starting materials or by extracting them with a solvent in which the interpolymer is insoluble, such as gasoline or carbon tetrachloride. The interpolymer can be further purified by dissolving it in a solvent for the polymer such as acetone and precipitating with a non-solvent such as gasoline.

The concentration of monomers in the reaction mixture does not have to be kept below 40%; in fact the reaction can be carried out in the absence of any solvent other than the copolymerizable monomers themselves. The relative proportions of the allylic fumarate and the allylic alcohol may be varied over a considerable range, depending upon the physical properties, and the amount of hydroxymethyl groups desired to be present in the polymeric product. The copolymerization of the allylic fumarate with as little as 10% of an allylic alcohol (based on the weight of the allylic fumarate) represses gelation of the reaction mixture during the early stages of the polymerization, and ensures the formation of a soluble, fusible product. The higher the amount of allylic alcohol present, the higher is the proportion of monomeric allylic fumarate which can be converted to the polymeric stage without insolubilization.

Since my interpolymers are soluble in allylic alcohols, I prefer to carry out the copolymerizations in the presence of an excess of the allylic alcohol for the resulting mobile, free-flowing solutions are easily handled in transfer, mixing, storage and other mechanical operations to which the solid interpolymers themselves might be less amenable. The allylic alcohol in my invention thus may serve not only as a copolymerizable monomer but also as a cheap volatile solvent, which because it shows little tendency to homopolymerize under these conditions can be easily removed from the reaction mixture by distillation and recovered for use in subsequent copolymerizations.

The useful allylic fumarates are the esters having the formula

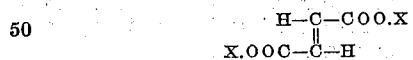

where X is an allylic radical such as allyl or 2-methallyl. The preferred fumarates are diallyl fumarate and dimethallyl fumarate.

The useful allylic alcohols are those having the formula

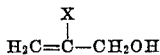

where X is hydrogen, or methyl, illustrated by allyl alcohol, and 2-methylallyl alcohol (customarily referred to as methallyl alcohol).

That my new products are true interpolymers is indicated by elementary analysis and other specific tests. They contain, attached to the polymer chain, hydroxylmethyl groups derived from the interpolymerized allylic alcohol molecules, which render the copolymers capable of being modified by agents known to react with primary alcohols, such agents including alkyl, allylic and acyl halides, organic acids and their anhydrides, aldehydes, etc., as well as the corresponding polyfunctional compounds such as the dihalides, diisocyanates, polycarboxylic acids, etc. By such reactions, my new copolymers can be converted into other modified polymers having desirable properties.

The presence of a substantial amount of alcoholic hydroxyl in the purified copolymer has been confirmed both by reaction with phenyl isocyanate and by infrared absorption measurements.

My copolymers can be cast or molded in a known manner to form rods, blocks or sheets. They can also be dissolved in an appropriate solvent and employed as lacquers or as impregnating and water-proofing compositions.

Application of heat to compositions containing my unsaturated interpolymers, particularly in the presence of catalyst, induces further polymerization, and the resulting cross-linked products are quite indifferent to heat and are strongly resistant to attack by solvents. Suitable dyes, pigments, fillers and plasticizers can be incorporated with my interpolymers at the soluble, fusible stage prior to final cure.

My unsaturated interpolymers can be dissolved in many organic solvents, particularly in copolymerizable compounds containing an ethylenic linkage such as methyl acrylate, diallyl fumarate, vinyl acetate, allyl acrylate, etc. The resulting solutions can be totally copolymerized to insoluble, infusible products without leaving any solvent to be evaporated. Even at high solids content, many of the solutions are still quite fluid, and can be employed as coating materials by spraying, brushing and dipping. They can also be employed in casting, laminating and impregnating operations particularly where articles capable of being pre-formed and then "set" or cured in a final shape are desired.

By the process of my invention, interpolymers corresponding to a combination of as much as 80% by weight of diallyl fumarate can be obtained which are both soluble and fusible.

The following examples disclose my invention in more detail. All parts are by weight.

EXAMPLE 1

To demonstrate that by copolymerization of an allylic fumarate with an allylic alcohol, gelation of the reaction mixture can be repressed, a series of mixtures of allylic alcohols and allylic fumarates, in varying proportions, are heated with benzoyl peroxide catalyst at 60° C. to the point of incipient gelation. The polymerizations are then halted by cooling and the products are isolated by pouring the reaction mixtures into gasoline. The precipitated polymers are further purified by dissolving them in acetone and precipitating with gasoline, and after drying the products, in vacuo, to constant weight, the conversions of monomers to polymers are determined. For purposes of comparison only, the allylic fumarates are also polymerized under identical conditions but in the absence of an allylic alcohol.

The results are summarized below in Table I wherein the weights of the monomers, peroxide and the purified products together with the times elapsed to the point of incipient gelation are recorded (except in the cases starred (d, h, i) which did not gel). It is readily apparent that by carrying out the copolymerization of an allylic fumarate with a sufficient quantity of an allylic alcohol, high yields of soluble, fusible copolymers are obtained. Comparison of a and e clearly indicates that even small amounts of the allylic alcohol are effective in increasing the amount of conversion of the monomeric allylic fumarate to the soluble, fusible copolymeric form.

*Table I*

|   | Diallyl Fumarate | Dimethallyl Fumarate | Allyl Alcohol | Methallyl Alcohol | Benzoyl Peroxide | Reaction Time, hrs. | Yield |
|---|---|---|---|---|---|---|---|
| a | 100 | | | | 1.0 | 4.25 | 9.0 |
| b | | 100 | | | 1.1 | 11.5 | 10.0 |
| c | | 100 | | 21.5 | 1.8 | 4.0 | 36.0 |
| d | | 100 | | 287.0 | 21.0 | ¹120.0 | 104.0 |
| e | 100 | | | 9.2 | 1.5 | 1 | 22.0 |
| f | 100 | | 19.7 | | 0.4 | 10.0 | 32.0 |
| g | 100 | | | 24.5 | 0.4 | 30.0 | 31.0 |
| h | 100 | | 266.0 | | 4.9 | ¹100.0 | 129.0 |
| i | 100 | | | 406.0 | 8.0 | ¹112.0 | 119.0 |

¹ No gelation.

EXAMPLE 2

A mixture of 100 parts of diallyl fumarate, 331 parts of methallyl alcohol and 5 parts of benzoyl peroxide is heated for 7 hours at 90–95° C. The polymerization is halted by cooling the reaction mixture and adding a trace of hydroquinone as a polymerization inhibitor. The major proportion of the unreacted methallyl alcohol is removed by distillation under diminished pressure and the polymeric residue is purified by repeatedly dissolving it in acetone and precipitating it with gasoline. After drying in vacuo to constant weight, 107 parts of solid product are obtained.

Analysis: Found—C, 63.7%; H, 7.16%; Iodine No. (Wijs) 139.

The analysis represents a conversion of at least 58% of the monomeric diallyl fumarate to the polymeric form. The iodine number indicates the large amount of unsaturation available in the interpolymer for further polymerization.

A solution of 6.0 parts of the interpolymer in 4.0 parts of acetone has a viscosity of 0.25 poise, and a solution of 3.75 parts of the interpolymer in 6.25 parts of the methyl acrylate has a viscosity of less than 0.005 poise at 25° C.

EXAMPLE 3

Samples of the unsaturated interpolymer prepared in Example 2 above are dissolved in the copolymerizable monomers listed below in Table II to form 70% solutions therein and the resulting compositions are heated together with benzoyl peroxide for 16 hours at 60° C. and then for 5 additional hours at 100° C. The resulting castings, whose hardnesses are also listed in Table II, are all transparent, insoluble in organic solvents such as acetone, and substantially infusible.

*Table II*

| | Interpolymer, parts | Monomer, parts | Peroxide, parts | Rockwell Hardness |
|---|---|---|---|---|
| a | 7.0 | n-butyl Acrylate, 3.0 | 0.06 | M68 |
| b | 7.0 | Diethyl Fumarate, 3.0 | 0.12 | M94 |
| c | 7.0 | Methyl Acrylate, 3.0 | 0.12 | M95 |
| d | 7.0 | Diallyl Fumarate, 3.0 | 0.06 | M111 |

EXAMPLE 4

A mixture of 100 parts of diallyl fumarate, 267 parts of allyl alcohol and 5 parts of benzoyl peroxide is heated at 90–95° C. for 7 hours. The reaction product is isolated and purified in the same manner as in Example 2 above and 113 parts of solid polymer are obtained as the final product.

Analysis: Found—C, 61.8%; H, 6.68%; Iodine No., 148.

Since the percentage of carbon in allyl alcohol (62.04) differs from that of diallyl fumarate (61.22) by less than 1.0% the elementary analysis cannot be relied upon to fix the relative proportions of two monomers which have entered the copolymer. However, the iodine number which measures the number of unpolymerized allylic groups in the diallyl fumarate units of the interpolymer indicates that the interpolymer is derived from a minimum of 57% by weight of diallyl fumarate.

A solution of 6.0 parts of the interpolymer in 4.0 parts of acetone has a viscosity of 0.6 poise at 25° C.

Seven parts of the interpolymer are dissolved in 3.0 parts of allyl acrylate together with 0.012 part of benzoyl peroxide, and the solution is heated at 60° C. for 16 hours and then at 100° C. for 5 hours. The resulting casting is clear and colorless and has a Rockwell hardness of M107.

EXAMPLE 5

A mixture of 100 parts of dimethallyl fumarate, 290 parts of methallyl alcohol and 4.32 parts of benzoyl peroxide is heated at 90–95° C. for 7 hours. After isolating and purifying the reaction product as in Example 2 above, 55 parts of solid polymeric material are obtained.

Analysis: Found—C, 64.8%; H, 7.75%; Iodine No., 110.5.

A solution of 6.0 parts of the interpolymer in 4.0 parts of acetone has a viscosity of 0.32 poise at 25° C. Three parts of this solution are admixed with 1.0 part of cyclohexanone and flowed onto a glass panel. The film is baked at 200° C. for 20 minutes to give a clear bubble-free coating which adheres firmly to the glass and is unattacked by acetone.

Seven parts of the interpolymer are dissolved in 3.0 parts of allyl acrylate together with 0.012 part of benzoyl peroxide, and the resulting solution is heated for 16 hours at 60° C. and then for 5 hours at 100° C. The resulting casting has a Rockwell hardness of M103.

The elementary analysis corresponds to a copolymer derived from approximately 78% by weight of dimethallyl fumarate and 22% of allyl alcohol. By carrying out the interpolymerization for longer reaction times as indicated above in Example 1—d, the major proportion of the monomeric dimethallyl fumarate can be converted to soluble interpolymeric form with a resulting increase in the yield of product.

It should be recognized that the compositions as indicated by an interpretation of the analyses are only proximate, since the calculations do not consider various side reactions which can occur during polymerization. These side reactions have the result of changing the C and H values of the polymer, from those represented by a strict copolymer of the monomers described. These possible side reactions can be lactonization, alcoholysis, and incorporation of peroxide residues into the polymer chains.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A method which comprises heating together a monomeric allylic fumarate in the presence of at least 10% of an allylic alcohol, based on the weight of the fumarate, and a peroxide catalyst, and stopping the reaction before the mixture gels, whereby to produce a high yield of an acetone-soluble interpolymer, the respective allylic radicals being selected from the class consisting of allyl and methallyl radicals.

2. A method which comprises heating together at a temperature in the range from about 25° C. to about 120° C., a monomeric allylic fumarate in the presence of at least 10% of an allylic alcohol, based on the weight of the fumarate, and a peroxide catalyst, and stopping the reaction before the mixture gels, whereby to produce a high yield of an acetone-soluble interpolymer, the respective allylic radicals being selected from the class consisting of allyl and methallyl radicals.

3. An acetone-soluble unsaturated interpolymer of a monomeric allylic fumarate and a monomeric allylic alcohol, characterized by the presence of alcoholic hydroxyl groups in the polymer structure, the respective allylic radicals being selected from the class consisting of allyl and methallyl radicals, the proportion of the alcohol combined in the copolymer being that which results from having in the original monomeric mixture an amount of the alcohol equal to at least 10% based on the weight of the monomeric fumarate and produced by heating the mixture in the presence of a peroxidic catalyst.

4. An acetone-soluble unsaturated interpolymer of diallyl fumarate and methallyl alcohol, characterized by the presence of alcoholic hydroxyl groups in the polymer structure, the proportion of the alcohol combined in the copolymer being that which results from having in the original monomeric mixture an amount of the alcohol equal to at least 10% based on the weight of the monomeric fumarate and produced by heating the mixture in the presence of a peroxidic catalyst.

5. An acetone-soluble unsaturated interpolymer of diallyl fumarate and allyl alcohol, characterized by the presence of alcoholic hydroxyl groups in the polymer structure, the proportion of the alcohol combined in the copolymer being that which results from having in the original monomeric mixture an amount of the alcohol equal to at least 10% based on the weight of the monomeric fumarate and produced by heating the mixture in the presence of a peroxidic catalyst.

6. An acetone-soluble unsaturated interpolymer of dimethallyl fumarate and methallyl alcohol, characterized by the presence of alcoholic hydroxyl groups in the polymer structure, the proportion of the alcohol combined in the copolymer being that which results from having in the original monomeric mixture an amount of the alchohol equal to at least 10% based on the weight of the monomeric fumarate and produced by heating the mixture in the presence of a peroxidic catalyst.

ROBERT H. SNYDER.

REFERENCES CITED

The following references are of record in the file of this patent:

UNITED STATES PATENTS

| Number | Name | Date |
|---|---|---|
| 2,331,263 | Britton et al. | Oct. 5, 1943 |
| 2,332,900 | D'Alelio | Oct. 26, 1943 |
| 2,340,111 | D'Alelio | Jan. 25, 1944 |
| 2,378,195 | D'Alelio | June 12, 1945 |